Figure 1:
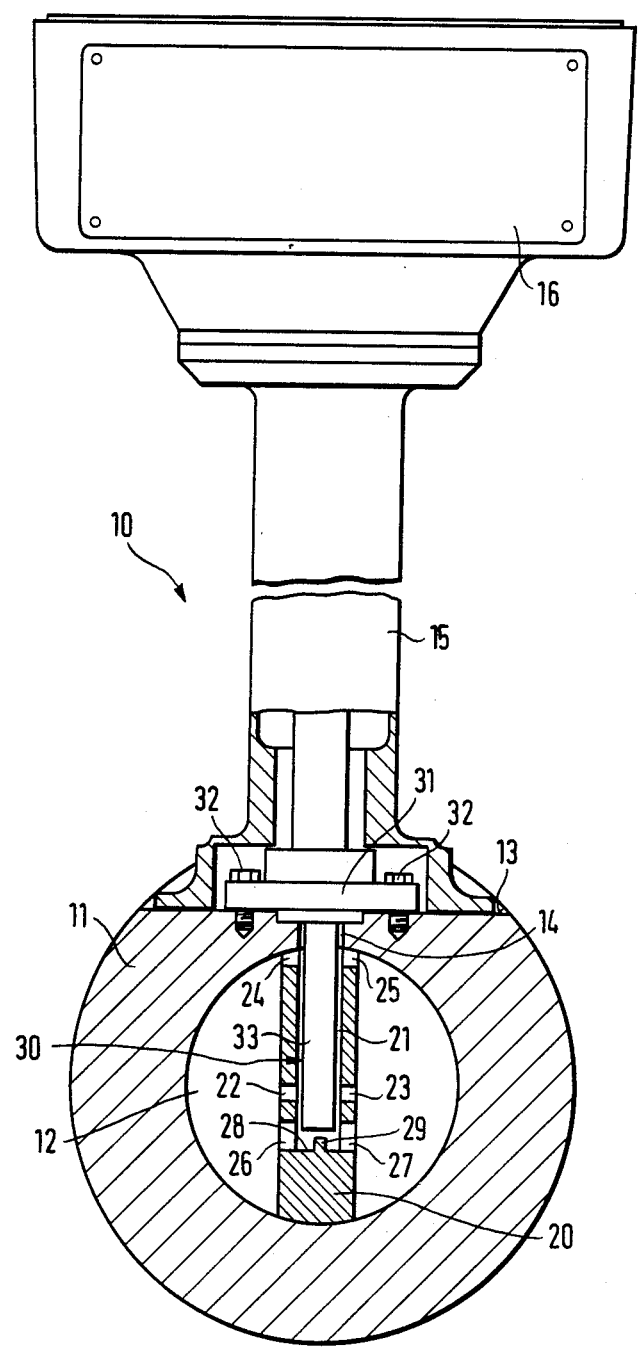

United States Patent [19]

Herzog

[11] Patent Number: 4,716,770
[45] Date of Patent: Jan. 5, 1988

[54] VORTEX FLOW METER

[75] Inventor: Michael Herzog, Witterswil, Switzerland

[73] Assignee: Flowtec AG, Switzerland

[21] Appl. No.: 940,581

[22] Filed: Dec. 11, 1986

[30] Foreign Application Priority Data

Dec. 13, 1985 [DE] Fed. Rep. of Germany ....... 3544198

[51] Int. Cl.⁴ .............................................. G01F 1/32
[52] U.S. Cl. .................................................. 73/861.24
[58] Field of Search ............ 73/861.22, 861.24, 861.21

[56] References Cited

U.S. PATENT DOCUMENTS

| | | | |
|---|---|---|---|
| 3,927,566 | 12/1975 | Zanker | 73/861.24 X |
| 4,186,599 | 2/1980 | Frick | 73/861.24 |
| 4,362,061 | 12/1982 | Yokogawa et al. | 73/861.24 |
| 4,627,295 | 12/1986 | Matsubara et al. | 73/861.24 |

FOREIGN PATENT DOCUMENTS

| | | |
|---|---|---|
| 0100931 | 2/1984 | European Pat. Off. . |
| 0110321 | 6/1984 | European Pat. Off. . |
| 0124916 | 7/1983 | Japan ........................ 73/861.24 |

*Primary Examiner*—Herbert Goldstein
*Attorney, Agent, or Firm*—Barnes & Thornburg

[57] ABSTRACT

A vortex flow meter for measuring the flow velocity of a fluid in a conduit includes a bluff body disposed in the flow passage of the conduit. The bluff body generates Kármán vortices whose recurrence frequency is characteristic of the flow velocity to be measured. In the bluff body a cavity is formed which via passages communicates with the flow passage of the conduit and in the cavity a capacitive vortex sensor is disposed which converts the vortex pressure fluctuations originating from the Kármán vortices to capacitance changes. The capacitive vortex sensor includes a first oscillating body in the form of a sensor sleeve which is deflectable by the vortex pressure fluctuations and an electrode holder which is disposed in the sensor sleeve and is formed as second oscillating body but is uncoupled from the vortex pressure fluctuations. The electrode holder carries at least one capacitor electrode which with an opposite electrode portion of the sensor sleeve forms a measured capacitance which varies on the deflections of the sensor sleeve relatively to the electrode holder caused by vortex pressure fluctuations. However, vibrations generated by external interfering influences cause similar deflections of the two oscillating bodies and thus do not result in any capacitance changes. The capacitive vortex sensor is thus insensitive to external vibrations and other interfering influences.

3 Claims, 5 Drawing Figures

VORTEX FLOW METER

The invention relates to a vortex flow meter for measuring the flow velocity of a fluid in a conduit comprising a bluff body which is arranged in the flow passage of the conduit and is formed to generate Kármán vortices, a vortex sensor which responds to the pressure fluctuations generated by the Kármán vortices, the vortex sensor having a first oscillating body which is deflectable by the vortex pressure fluctuations, and a capacitive transducer comprising an electrode holder which is disposed in a cavity, sealed with respect to the fluid, of the first oscillating body and which carries at least one capacitor electrode which lies opposite an electrode portion of the first oscillating body in such a manner that it forms therewith a measured capacitance which is variable on a deflection of the first oscillating body caused by the vortex pressure fluctuations, the electrode holder being constructed as second oscillating body which is uncoupled from the vortex pressure fluctuations, and an evaluation circuit which includes a capacitance measuring circuit which is connected to the or each capacitor electrode and which in dependence upon the changes of the or each measured capacitance generates an electrical signal characteristic of the frequency of the vortex pressure fluctuations and thus of the flow velocity in the conduit. In a vortex flow meter of this type known from U.S. Pat. No. 4,362,061 the bluff body itself forms the first oscillating body of the vortex sensor. The bluff body thus contains a cavity which is sealed with respect to the fluid and in which the electrode holder of the capacitive transducer is disposed. The bluff body is lengthened by an extension to more than twice the diameter of the flow passage and mounted at both ends in such a manner that is set in flexural oscillations by the vortex pressure fluctuations. By the oscillating movement of the bluff body relatively to the electrode holder stationary in its cavity capacitance changes result between the electrodes carried by the electrode holder and the wall portions of the bluff body cavity opposite said electrodes. The electrode holder is rod-shaped and clamped at one end so that it forms a second oscillating body which under the influence of external forces can also be set into flexural oscillations by which its free end carrying the electrodes is deflected. By suitable dimensioning of the oscillation behaviour of bluff body and electrode holder the aim is to achieve that the deflections of these two oscillating bodies at the level of the electrodes under the influence of vibrations or similar disturbing influences are substantially of equal magnitude and equidirectional so that such deflections do not result in any capacitance changes. However, this condition can only be achieved with difficulty and incompletely because in particular the configuration of the first oscillating body is governed predominantly by its function as bluff body. Due to the predetermined cross-section and the necessary strength of the bluff body the oscillating amplitudes obtainable by the vortex pressure fluctuations and accordingly the capacitance changes resulting therefrom are relatively small and this impairs the sensitivity of the vortex sensor. Furthermore, the oscillation behaviour of the electrode holder cannot be adapted very well to the oscillating behaviour of the bluff body so that only partial compensation of vibrations and similar interferences is possible. Also, in particular with relatively large nominal widths of the flow passage, it is often undesirable for the bluff body itself to oscillate.

The problem underlying the invention is to provide a vortex flow meter of the type set forth at the beginning which with greater sensitivity provides an optimum compensation of vibrations and similar interfering influences without impairing the function of the bluff body.

According to the invention this problem is solved in that in the bluff body a cavity is formed which via passages is in communication with the flow passage of the conduit and that the first oscillating body is a sensor sleeve which surrounds the electrode holder and which is disposed in the cavity of the bluff body.

In the vortex flow meter according to the invention the two oscillating bodies of the vortex sensor are independent of the bluff body. The bluff body can therefore be made and mounted rigidly and immovably. The sensor sleeve forming the first oscillating body of the vortex sensor can be constructed solely with regard to the desired oscillation behaviour. In particular, the sensor sleeve can be constructed so that it reacts to the vortex pressure fluctuations with flexural oscillations of large amplitude and as a result the vortex sensor has a high sensitivity. Furthermore, the sensor sleeve and the electrode holder can be constructed as similar oscillating bodies with the same oscillation behaviour, for example as flexural oscillators clamped at one end, the free ends of which carry the capacitor electrodes. They then behave under the action of vibrations or similar interfering influences in completely identical manner so that these interferences are compensated in optimum manner. Finally, the construction of the vortex flow meter according to the invention also gives a very small overall height because the bluff body with the vortex sensor disposed in its recess need not be longer than the diameter of the flow passage.

Advantageous embodiments and further developments of the invention are characterized in the subsidiary claims.

Figure 2:
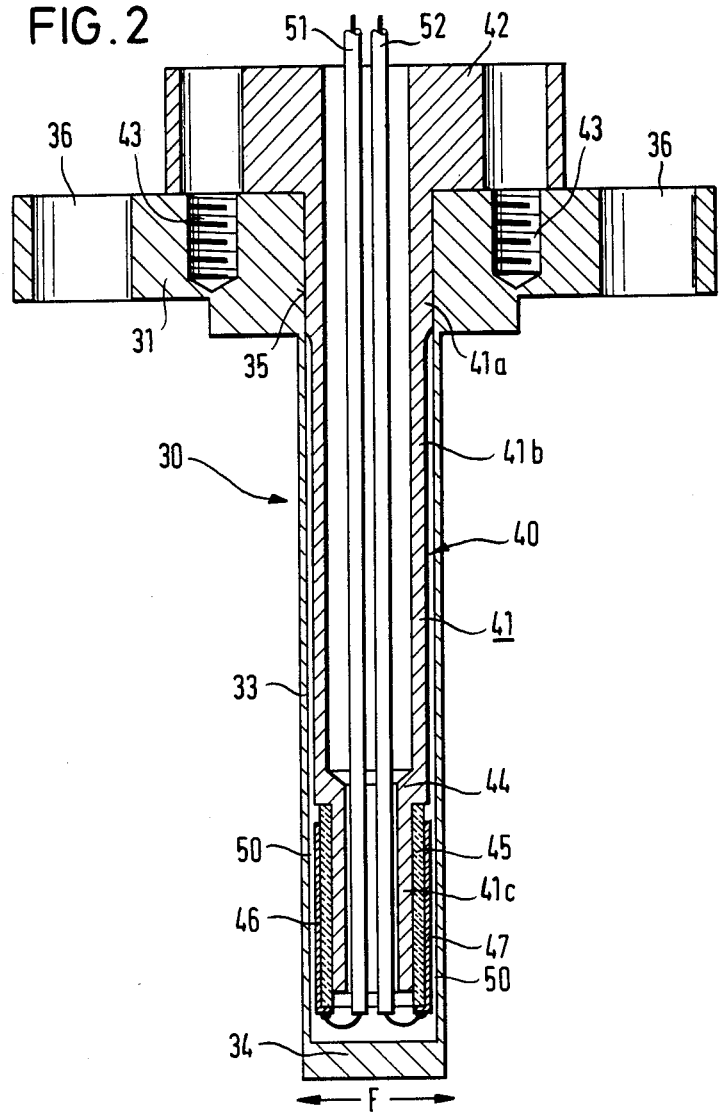
Figure 3:
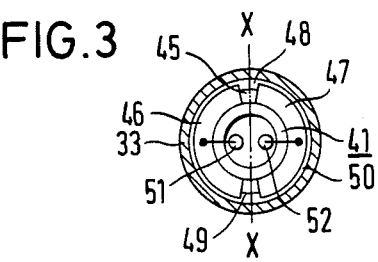
Figure 4:
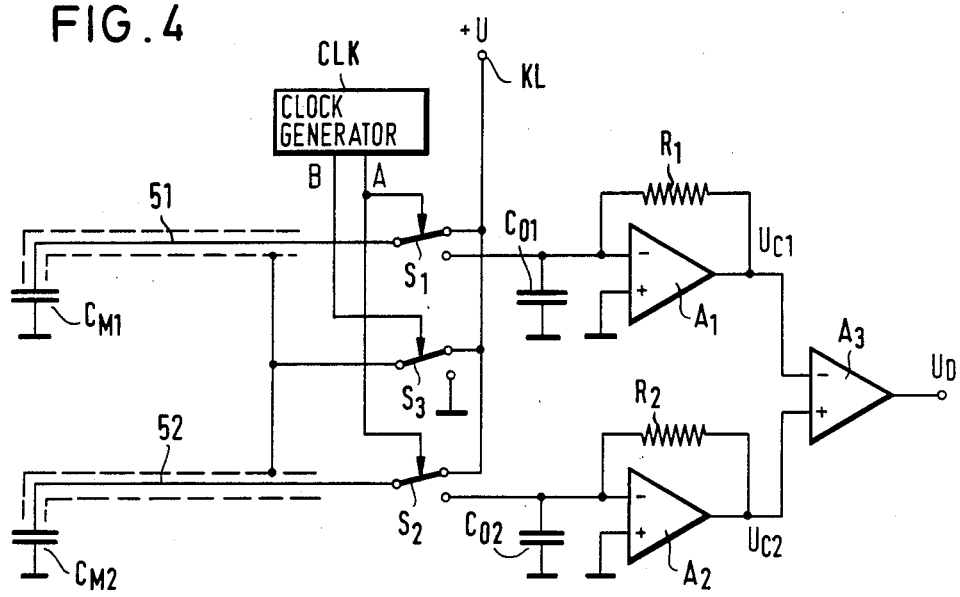
Figure 5:
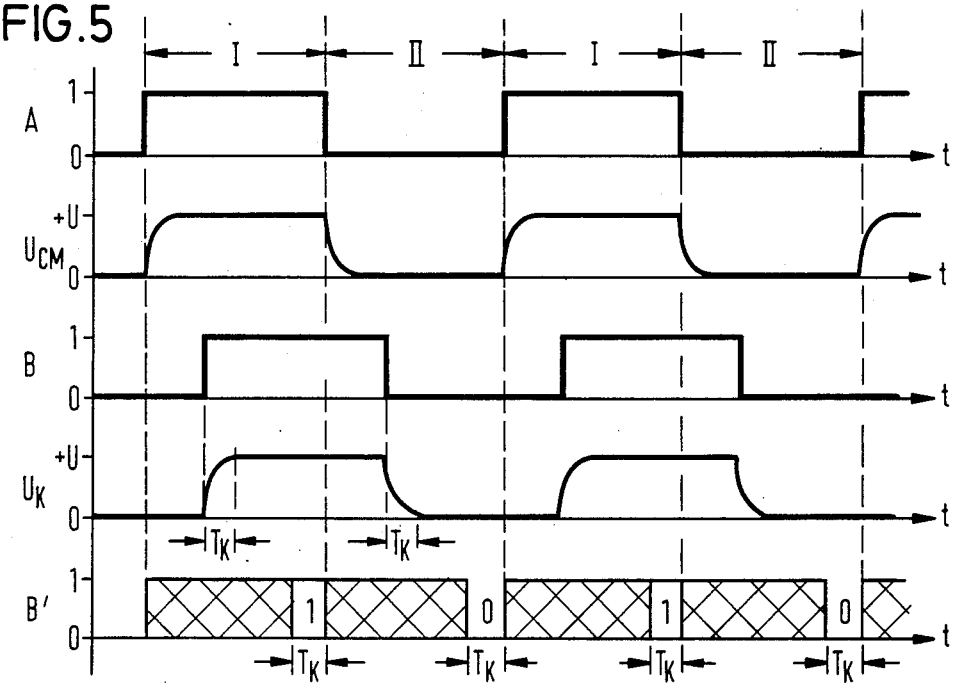

Further features and advantages of the invention will be apparent from the following description of an example of embodiment which is illustrated in the drawings, wherein:

FIG. 1 is a sectional view of an embodiment of the vortex flow meter according to the invention, FIG. 2 is a sectional view of the vortex sensor of the vortex flow meter of FIG. 1, FIG. 3 is an end view of the electrode holder of the vortex sensor of FIG. 2, FIG. 4 is a capacitance measuring circuit which can be used in conjunction with the vortex flow meter according to the invention, and FIG. 5 shows time diagrams explaining the mode of operation of the capacitance measuring circuit of FIG. 4.

The vortex flow meter 10 illustrated in FIG. 1 of the drawings has a measuring tube 11 which is shown in cross-section and which is inserted into the pipe or conduit through which the fluid (liquid, gas) flows whose flow velocity is to be measured. The fluid thus flows in the illustration of FIG. 1 perpendicularly to the plane of the drawing through the flow passage 12 of the measuring tube 11. At the side of the measuring tube 11 lying at the top in FIG. 1 a flattened portion 13 is formed from which a radial bore 14 leads into the interior of the measuring tube. On the flattened portion 13 a tubular housing support 15 is secured which carries a circuit housing 16 at the end opposite the measuring tube 11.

In the interior of the measuring tube 11 a bluff body 20 is disposed which extends diametrically across the entire diameter of the flow passage 12 and at both ends is fixedly connected to the wall of the measuring tube 11. The bluffbody 20 is formed in a manner known in vortex flow meters in such a manner that it generates Kármán vortices in the fluid. The bluff body 20 is a prismatic body of constant cross-section which for example has the form of an equilateral triangle whose base line faces the flow direction. At this bluff body 20 two parallel vortex streets form, the vortices of the one vortex street being offset with respect to the vortices of the other vortex street. The measurement of the flow velocity is based on the fact that the distance between successive vortices in each vortex street is almost constant over a large range of flow velocities. The recurrence frequency of the Kármán vortices is thus proportional to the flow rate. The vortex flow meter is thus so designed that it furnishes a signal which is characteristic of the recurrence frequency of the Kármán vortices.

For this purpose in the bluff body 20 an axial cavity 21 is formed which extends from the upper end of the bluff body in FIG. 1 over the major part of the length thereof. The bluff body 20 is mounted in the measuring tube 11 so that the cavity 21 lies coaxially with the bore 14. The cavity 21 is preferably cylindrical and has the same inner diameter as the bore 14. It communicates with the flow passage 12 of the measuring tube 11 via a plurality of passages which extend transversely of the flow direction through the bluff body 20 and lie opposite each other in pairs. A first pair of passages 22, 23 lies substantially at the level of the axis of the flow passage 12, i.e at half the height of the bluff body 20. A second pair of passages 24, 25 lies at the upper end of the bluff body 20 directly at the wall of the measuring tube 11. A third pair of passages 26, 27 is disposed at the lower end of the cavity 21 at the level of the end wall 28 bordering the cavity. In the centre between the two lower passages 26 and 27 at the end wall 28 a partition 29 of lesser height is formed and lies parallel to the axis of the measuring tube 11.

A vortex sensor 30 projects through the bore 14 into the cavity 21 where it extends almost up to the partition 29. The vortex sensor 30 is carried by a flange 31 which is secured by means of screws 32 to the flattened portion 13.

The vortex sensor 30 is shown in more detail in the sectional view of FIG. 2. It consists of two parts. The first part is a tubular sensor sleeve 33 which is connected at one end to the flange 31 and at the opposite end is sealed by an end wall 34. The flange 31 comprises a centre opening 35 which lies coaxial with the sensor sleeve 33 and the diameter of which is equal to the inner diameter of the sensor sleeve 33. Furthermore, the flange 31 comprises a plurality of bores 36 distributed about the periphery for the passage of screws 32 with which it is secured to the flattened portion 13 (FIG. 1). The sensor sleeve 33 can be formed together with the end wall 34 in one piece with the flange 31 from the same material, for example steel.

The second part of the vortex sensor 30 is an electrode holder 40 which projects through the centre opening 35 of the flange 31 into the interior of the sensor sleeve 33. The electrode holder 40 consists of a tube 41 which is connected to a second flange 42 and preferably made in one piece with the flange 42, for example also of steel. The flange 42 is secured by means of screws 43 to the upper side of the flange 31 so that the electrode holder 34 projects through the centre opening 35 into the interior of the sensor sleeve 33 where it extends almost up to the end wall 34.

The tube 41 of the electrode holder 34 has three portions of different diameter. A first portion 41a which is mounted in the centre opening 35 of the flange 31 has an outer diameter which is equal to the diameter of the centre opening 35, ensuring a firm fit and an exact positioning of the electrode holder. The outer diameter of a second portion 41b, making up the greater part of the length of the electrode holder, is somewhat smaller than the inner diameter of the sensor sleeve 33 so that around the periphery a narrow annular gap exists between the portion 41b and the sensor sleeve 33. The end portion 41c of the tube 41 adjoins via an inwardly projecting shoulder 44 the centre portion 41b and has a substantially smaller diameter. This end portion 41c carries an insulating sleeve 45 whose outer diameter is somewhat less than the outer diameter of the centre portion 41b. The insulating sleeve 45 can consist for example of ceramic. On the insulating sleeve 45 two capacitor electrodes 46 and 47 are disposed and cover the major part of the peripheral surface and the lower end face of the insulating sleeve 45 but at two points diametrically opposite each other are mechanically and electrically separated from each other by gaps 48, 49 as shown by the bottom end elevation of FIG. 3. The capacitor electrodes 46, 47 may be formed by a metallization applied to the insulating sleeve 45 or metal foils adhered thereto. The thicknesses of the insulating sleeve 45 and the capacitor electrodes 46, 47 are so dimensioned that between the capacitor electrodes 46, 47 and the inner face of the sensor sleeve 33 an annular gap 50 of small width remains round the periphery.

Each capacitor electrode 46, 47 forms with the opposite portion of the insulating sleeve 33, acting as counter-electrode, a capacitor whose dielectric is air. The capacitance of each of these capacitors is proportional to the surface area extent of the capacitor electrode and is inversely proportional to the gap width between the capacitor electrode and the sensor sleeve.

To the portions of the capacitor electrodes 46 and 47 covering the lower end face of the insulating sleeve 45 the inner conductors of two shielded cables 51, 52 are soldered, said cables being led through the hollow interior of the electrode holder 40 and through the tubular housing support 15 and connecting the capacitor electrodes 46, 47 to the electronic evaluation circuit of the vortex flow meter accommodated in the circuit housing 16.

As FIG. 1 shows the outer diameter of the sensor sleeve 33 of the vortex sensor 30 is somewhat less than the inner diameter of the cavity 21 in the bluff body 20 so that the sensor sleeve 33 is in spaced relationship all round with the wall of the cavity 21. A free space thus exists in the cavity 21 round the sensor sleeve 33 and is filled via the passages 22 to 27 with the fluid flowing through the flow passage 12 of the measuring tube 11. The vortex sensor 30 is incorporated into the bluff body 20 in such a manner that the capacitor electrodes 46, 47 lie symmetrically with respect to the axial centre plane which contains the axes of the measuring tube 11 and of the bluff body 20 and is indicated in FIG. 3 by the line X—X.

The construction of the vortex flow meter 10 described results in the following mode of operation:

Each of the two components of the vortex sensor 30, that is the sensor sleeve 33 and the electrode holder 40, represents an elongated oscillating body which is held at one end and the free end of which can be deflected transversely of its longitudinal direction out of the rest position illustrated in FIG. 2 under the action of external forces.

When a fluid flows through the measuring tube 11 and the two Kármán vortex streets form a the bluff body 20, oppositely phased periodic pressure fluctuations are generated on the two sides of the bluff body and are transmitted through the passages 22 and 23 into the cavity 21 and act on the sensor sleeve 33. Under the influence of the forces exerted by these vortex pressure fluctuations the sensor sleeve 33 is deflected transversely of its longitudinal direction and transversely to the flow direction alternately in opposite directions. Since the sensor sleeve 33 is firmly clamped at the upper end the deflection consists in a bending so that the sensor sleeve under the action of the vortex pressure fluctuations executes flexural oscillations whose frequency is equal to the frequency of the pressure fluctuations. The flexural oscillation natural resonance frequency of the sensor sleeve 33 is very much higher than the higest frequency of the vortex pressure fluctuations occurring so that the flexural oscillations of the sensor sleeve 33 are subcritically stimulated and in frequency and phase exactly follow the vortex pressure fluctuations. The amplitudes of the flexural oscillations are very small and the parts of the vortex sensor 30 are so constructed and dimensioned that the sensor sleeve 33 with the largest oscillation amplitudes occurring does not strike either the wall of the cavity 21 or the electrode holder 40.

The upper passages 24, 25 and the lower passages 26, 27 in the bluff body 20 permit a free circulation of the fluid between the cavity 21 and the flow passage 12 so that the fluid can yield without obstruction to the flexural oscillations of the sensor sleeve 33 and follow said oscillations. The partition 29 between the lower passages 26 and 27 prevents a direct pressure compensation round the lower end of the sensor sleeve.

The electrode holder 40 disposed in the interior of the sealed sensor sleeve 33 is not in contact with the fluid and is therefore completely uncoupled from the pressure fluctuations thereof. The electrode holder 40 is therefore not set in flexural oscillations by the vortex pressure fluctuations but remains at rest. Consequently, the free end of the sensor sleeve 33 moves under the influence of the vortex pressure fluctuations relatively to the stationary free end of the electrode holder as indicated in FIG. 2 by the double arrow F. During this relative movement the widths of the air gaps 50 between the electrodes 46, 47 and the opposite wall of the sensor sleeve 33 change in opposite directions: when the distance between the sensor sleeve 33 and the electrode 46 decreases the distance between the sensor sleeve 33 and the electrode 47 simultaneously increases and vice versa. Consequently, the capacitance values of the capacitors formed by the two electrodes 46, 47 and the sensor sleeve 33 change oppositely to the frequency of the vortex pressure fluctuations. The electronic evaluation circuit of the vortex flow meter accommodated in the circuit housing 16 can therefore generate on the basis of these capacitance changes an electrical signal which is characteristic of the frequency of the vortex pressure fluctuations and thus also of the flow velocity in the measuring tube 11.

If however external forces act on the system and are transferred via the clamping points to the two oscillating bodies, i.e. the sensor sleeve 33 and the electrode holder 40, the two oscillating bodies can be set by such external forces jointly into flexural oscillations. Such external forces can arise in particular from vibrations which set the measuring tube and thus the clamping point into a translational oscillating motion in any axial direction or which may also tend to turn the two oscillating bodies about their clamping points. Such external influences deflect in the same sense the free ends of the sensor sleeve 33 and electrode holder 40. By suitable construction and dimensioning of these two parts it can be achieved that on these equidirectional deflections the width of the gap 50 between the capacitor electrodes 46, 47 and the sensor sleeve 33 does not change appreciably. Thus, such external influences do not cause any change of the two capacitances of the vortex sensor. If however simultaneously with such external influences vortex pressure fluctuations are present they cause an additional deflection of the sensor sleeve 33 which is superimposed on the joint deflection of the two oscillating bodies and results in an opposite change in the two capacitances. The vortex sensor described is thus insensitive to vibrations in any axial directions or similar interfering influences but permits a reliable detection of the pressure fluctuations caused by Kármán vortices even when such external interfering influences are present.

The electronic evaluation circuit is preferably so designed that it generates a signal which depends on the difference between the two capacitances of the vortex sensor. Since the two capacitances change in opposite directions the difference signal corresponds to twice the capacitance change whilst the equisized basic capacitances are eliminated from the difference signal. This permits firstly a very exact and sensitive detection of the capacitance changes and secondly the elimination of the influence of further interfering quantities which can impair the function of the vortex flow meter. This applies in particular to the temperature and static pressure of the fluid. The vortex flow meter may be used under very different temperature and pressure conditions and even within the same field of use the temperature and pressure of the fluid can vary within wide ranges.

Due to the thermal coefficients of expansion of the materials used for the various parts the temperature changes influence the dimensions of the parts of the vortex sensor. If the parts have the same coefficient of thermal expansion their dimensions change in the same proportion so that no changes result for the two capacitances. With different coefficients of thermal expansion of the parts different length changes of the sensor sleeve and the electrode holder have no influence on the two capacitors. Admittedly, different diameter changes of these parts can lead to changes in the basic capacitances but this is of no significance to the signal evaluation because the basic capacitances are eliminated on forming the difference signal; the capacitance difference, the only magnitude detected, remains uninfluenced by temperature-induced changes.

Changes in the static pressure of the fluid can change the cross-section of the sensor sleeve by deformation. This also results in a change in the width of the air gap 50 and thus the value of the two basic capacitances. Since because of the symmetrical construction such a cross-sectional change has the same effect on both basic capacitances, it is eliminated on formation of the difference so that the difference signal is not influenced by the static pressure.

It should be emphasized in this connection that the example of embodiment of the vortex sensor described because of the cylindrical form of the sensor sleeve has a particularly good compressive strength and is therefore suitable for uses in which high pressures or high pressure fluctuations occur.

A further cause of error in the signal evaluation can result from the shielded cables 51 and 52 via which the capacitor electrodes 46 and 47 are connected to the evaluation circuit moving under the influence of vibrations or other interfering influences relatively to the electrode holder so that the evaluation circuit picks up varying interference capacitances. Such a relative movement of the cable can be prevented by fixing, for example by means of a casting or potting composition. The influence of interference capacitances however can also be eliminated by an active shielding of the cable. As generally known, the principle of active shielding consists in that the potential of the shielding is always made to follow the potential of the measuring electrode. In the upper region of the vortex sensor such an active shielding is in any case necessary for reduction of static capacitance and sensitivity to touch.

FIG. 4 shows a capacitance measuring circuit which is particularly suitable as input stage of the electronic evaluation circuit of the vortex flow meter described. The capacitance measuring circuit is made by the principle known from DE-OS No. 3,143,114 of "switched capacitors". It permits a very sensitive and exact measurement of capacitance changes even when they are very small. In addition the capacitance measuring circuit of FIG. 4 is so designed that it permits an active shielding in very simple manner.

FIG. 4 shows the two measured capacitances $C_{M1}$ and $C_{M2}$ of the vortex sensor 30, the measured capacitance $C_{M1}$ being the capacitance existing between the grounded sensor sleeve 33 and the capacitor electrode 46 connected via the shielded cable 51 to the evaluation circuit. In corresponding manner the measured capacitance $C_{M2}$ is the capacitance existing between the grounded sensor sleeve 33 and the capacitor electrode 47 connected via the shielded cable 52 to the evaluation circuit. The shields of the two cables 51 and 52 are indicated by dashed lines.

The capacitance measuring circuit includes two completely identical circuit branches each associated with one of the two measured capacitances. The circuit branch connected to the measured capacitance $C_{M1}$ via the cable 51 includes a changeover switch $S_1$ which in the one position, illustrated in FIG. 4, connects the inner conductor of the cable 51 to a terminal KL which carries with respect to ground a constant positive direct voltage $+U$ which for example is the operating voltage of the circuit. In the other position the switch $S_1$ connects the measured capacitance $C_{M1}$ to a storage capacitor $C_{0l}$ whose capacitance is very large compared with the measured capacitance $C_{M1}$. Also connected to the interconnected terminals of the switch $S_1$ and the storage capacitor $C_{0l}$ is the inverting input of an operational amplifier $A_1$ whose non-inverting input is connected to ground and whose feedback circuit between the output and the inverting input includes a resistor $R_1$.

The circuit branch associated with the measured capacitance $C_{M2}$ includes in corresponding manner a changeover switch $S_2$, a storage capacitor $C_{02}$ and an operational amplifier $A_2$ with a feedback resistor $R_2$.

The outputs of the two operational amplifiers $A_1$ and $A_2$ are connected to the two inputs of a differential amplifier $A_3$.

The two switches $S_1$ and $S_2$ are actuated by a control signal A which is furnished at an output of a clock generator CLK. The clock generator CLK furnishes at a second output a control signal B which actuates a changeover switch $S_3$ which in the one position connects the shields of the two cables 51 and 52 to the voltage $+U$ of the terminal KL and in the other position to ground.

The mode of operation of the capacitance measuring circuit of FIG. 4 will be explained with the aid of the time diagrams of FIG. 5. The description of the circuit branch associated with the measured capacitance $C_{M1}$ applies of course in identical manner to the other circuit branch as well.

The diagram A shows the time variation of the control signal A which actuates the two switches $S_1$ and $S_2$. The control signal A assumes periodically and alternately two states 0 or 1 and it is assumed that each switch $S_1$, $S_2$ for the value 1 of the control signal A has the position shown in FIG. 4 in which it connects the associated measured capacitance $C_{M1}$, $C_{M2}$ to the terminal KL whilst for the value 0 of the control signal A it separates the associated measured capacitance from the terminal KL and connects it instead to the associated storage capacitor $C_{0l}$ or $C_{02}$, respectively.

The diagram $U_{CM}$ of FIG. 5 shows the time variation of the voltage at each measured capacitance $C_{M1}$, $C_{M2}$ and thus also the voltage on the inner conductor of the associated cable 51 and 52, respectively. If the first circuit branch is now considered, in each phase I corresponding to the value 1 of the control signal A the measured capacitance $C_{M1}$ is charged to the voltage $+U$. Because of the unavoidable time constant of the charging circuit the charging does not take place without delay but the duration of the phase I is made large enough to be sure that the voltage $U_{CM}$ at the measured capacitance $C_1$ is certain to reach the full value $+U$. In the phase II, which corresponds to the value 0 of the control signal A, the measured capacitance $C_{M1}$ discharges with the corresponding time constant to the storage capacitor $C_{01}$. Since the capacitance of the storage capacitor $C_{01}$ is very large compared with the measured capacitance $C_{M1}$, the voltage at said two capacitances after the charge distribution is very small compared with the voltage $+U$. The duration of the phase II, which is preferably equal to the duration of the phase I, is so dimensioned that the complete charge distribution is certain to take place.

In the following phase I the measured capacitance $C_{M1}$ is again charged to the voltage $+U$ whilst the charge of the storage capacitor $C_{01}$ is slowly led off through the operational amplifier $A_1$ acting as current-voltage converter. The charge distribution is effected by a current which flows via the resistor $R_1$ and results in the voltage at the storage capacitor $C_{0l}$ being held on average substantially at the value zero. The current flowing via the resistor $R_1$ is equal to the mean value of the current discharged by the measured capacitance $C_{M1}$. To maintain this current the output voltage of the operational amplifier $A_1$ assumes a value $U_{C1}$ which is exactly proportional to the measured capacitance $C_{M1}$.

In the same manner the output voltage of the operational amplifier $A_2$ of the other circuit branch assumes a value $U_{C2}$ which is exactly proportional to the value of the measured capacitance $C_{M2}$.

The differential amplifier $A_3$ forms the difference between the two voltages $U_{C1}$, $U_{C2}$ and furnishes at the output a voltage $U_D$ which is exactly proportional to the difference between the two measured capacitances $C_{M1}$, $C_{M2}$.

If no particular precautions are taken the capacitance of each of the two shielded cables 51, 52 is added to the measured capacitance, and capacitance changes of the cable affect the measurement. To eliminate the influence of the cable capacitances in the capacitance measuring circuit of FIG. 4 an active shielding is used in that the potential of the cable shield is made to follow the potential on the shielded inner conductor of the cable. According to the prior art such an active shielding is effected in that the potential of the shielded conductor is permanently sampled and via an impedance transducer applied to the shield. In contrast, in the capacitance measuring circuit of FIG. 4 the active shielding is effected in particularly simple and effective manner with the aid of the changeover switch $S_3$ actuated by the control signal B without any feedback of the potential of the shielded line being necessary.

The diagram B of FIG. 5 shows the time variation of the control signal B which with the same recurrence frequency as the control signal A periodically alternately assumes the values 0 and 1. The diagram $U_K$ of FIG. 5 shows the time variation of the voltage at the shields of the two cables 51 and 52. When the control signal B assumes the value 1 the two cable shields are applied to the voltage $+U$ and the voltage $U_K$ reaches the voltage value $+U$ after a recharge time $T_K$ governed by the time constant. When the control signal B assumes the value 0 the cable shields are applied to ground potential and the voltage $U_K$ reaches the voltage value 0 again after the recharge time $T_K$.

The following is apparent from the diagrams of FIG. 5: If the control signals A and B are exactly in-phase the voltages $U_{CM}$ and $U_K$ also have substantially the same time variation. This fulfils the condition of active shielding that the potential of the shield continuously follows the potential of the shielded electrode. However, in FIG. 5 the control signals A and B are deliberately shown phase-displaced with respect to each other to illustrate that it is not essential to maintain exact time relationships. Although there is then in each phase II at the start a time portion in which the measured capacitance $C_{M1}$ is already discharging into the storage capacitor $C_{0l}$ whilst the voltage $+U$ is still applied to the cable shield so that the cable capacitance is being charged and the corresponding charge is flowing to the storage capacitor $C_{0l}$, when subsequently in the same phase II the shield is applied to ground whilst the shielded conductor is still connected to the storage capacitor $C_{0l}$ the same charge flows back again from the storage capacitor $C_{0l}$ to the shield capacitance. Thus, on an average these charge displacements cancel each other out so that on the storage capacitor $C_{0l}$ effectively only the charge of the measured capacitance $C_{M1}$ to be detected remains, this charge alone being decisive for the current through the resistor $R_1$ and thus for the voltage $U_{C1}$ at the output of the operational amplifier $A_1$.

The requirements regarding the time location of the control signal B with respect to the control signal A are thus not critical. It is merely necessary to observe the time conditions that the shield voltage $U_K$ before the start of each phase II must have reached the voltage value $+U$ and before the start of each phase I the voltage value 0. Taking account of the recharge time $T_K$ this means that the control signal B must be brought to the value 1 at the latest a time $T_K$ before the start of each phase II and must be brought to the value 0 at the latest the time $T_K$ before the start of each phase I. This gives the time conditions illustrated in diagram B': The control signal B can have any values in the cross-hatched regions and must have the specified signal value only in the regions of the duration $T_K$ marked by "1" and "0" respectively.

The changeover switches $S_1$, $S_2$, $S_3$ are represented as mechanical switches in FIG. 4 only for clarity. In reality these are of course very highspeed electronic switches, for example MOS field-effect transistors. Since such electronic switches do not act as changeover switches but as simple on-off switches, each changeover switch of FIG. 4 must be replaced by two such electronic switches which are driven in opposite phase by the respective control signal. To ensure that the two electronic switches are not opened simultaneously it may be expedient to insert between the successive switching phases in each case brief intervals in which the two electronic switches forming together a changeover switch are simultaneously blocked.

The changeover switch $S_3$ can also be replaced by a threshold value comparator which receives the control signal A and furnishes at its output either the voltage $+U$ or the voltage 0 depending on the value of its input signal. This gives a further simplification of the circuit.

In the vortex flow meter described above the two parts of the vortex sensor displaceable relatively to each other, i.e. the sensor sleeve 33 and the electrode holder 34, form a capacitive sensor which acts as mechanoelectrical transducer and converts relative movements between the two parts to capacitance changes. The formation of two oppositely changeable measured capacitances with the aid of two capacitor electrodes has the advantage that the capacitance measuring circuit can form a differential signal which is free from the mean value and which represents only the capacitance changes. This step is however not absolutely essential; the measurement of the frequency of the vortex pressure fluctuations is also possible when the electrode holder carries only one capacitor electrode and thus only one measured capacitance is present. In this case the second circuit branch of the capacitance measuring circuit of FIG. 4 is simply dispensed with and the information on the flow velocity is contained in the changes of the output voltage of the remaining circuit branch. In this case as well the described compensation of vibrations and other interfering influences is completely obtained.

Both as regards the compensation of vibrations and other interfering influences and as regards the sensitivity of the vortex flow meter it is particularly advantageous to make the sensor sleeve 33 from titanium. The modulus of elasticity of titanium is substantially less than the modulus of elasticity of steel; thus, a sensor sleeve in titanium under the influence of the vortex pressure fluctuations undergoes a substantially greater deflection than a sensor sleeve of the same dimensions in steel. Since the capacitance changes are proportional to the deflection the sensitivity of the vortex sensor is correspondingly greater. On the other hand with titanium the ratio of density to elasticity modulus is of the same order of magnitude as for steel so that an oscillating body of titanium has a similar oscillation behaviour to an oscillating body in steel. Thus as regards compensation of vibrations and other interfering influences a sensor sleeve of titanium can be combined very well with an electrode holder of steel. Furthermore, in this manner the advantageous properties of titanium, in particular the very good resistance to corrosion and high fatigue strength, can be utilized for the sensor sleeve.

I claim:

1. Vortex flow meter for measuring the flow velocity of a fluid in a conduit, the vortex flow meter comprising a Karman vortex generating bluff body arranged in the flow passage of the conduit, a cavity formed in the bluff body, the cavity being in communication with the flow passage via passages formed in the bluff body, a vortex sensor which is disposed in the cavity and responds to the pressure fluctuations generated by the Karman vortex train, the vortex sensor having a capacitive transducer including two escillating bodies, the first oscillating body being a sensor sleeve which is disposed in the cavity so as to be deflectable by the vortex pressure fluctuations, the interior of the sensor sleeve being sealed with respect to the flow passage, and the second oscillating body being an electrode holder which is disposed within the sensor sleeve so as to be uncoupled from the vortex pressure fluctuations and which carries at least one capacitor electrode, each of which lies opposite an electrode portion of the sensor sleeve in such a manner that it forms therewith a measured capacitance which is variable in response to deflection of the sensor sleeve caused by the vortex pressure fluctuations, an evaluation circuit which includes a capacitance measuring circuit which is connected to the at least one capacitor electrode by means of a shielded cable and which in response to changes of the at least one measured capacitance generates an electrical signal characteristic of the frequency of the vortex pressure fluctuations and thus of the flow velocity in the conduit, the capacitance measuring circuit including for each measured capacitance a switchover means which alternately and periodically with a predetermined switchover frequency connects the measured capacitance for charging to a constant voltage and for discharging to a storage capacitor whose capacitance is large compared with the measured capacitance and whose terminal voltage is held substantially at a constant reference potential by a controlled discharge current, the magnitude of the discharge current being proportional to the measured capacitance and representing the measured value, and a further switchover means which with the switchover frequency periodically and alternately connects the cable shield to the constant voltage and to the reference potential, respectively.

2. Vortex flow meter according to claim 1, characterized in that the sensor sleeve is clamped at one end such that it is set in flexural oscillations by the vortex pressure fluctuations.

3. Vortex flow meter according to claim 1, characterized in that the sensor sleeve consists of titanium.

* * * * *